United States Patent
Hyogo et al.

(10) Patent No.: US 8,542,369 B2
(45) Date of Patent: Sep. 24, 2013

(54) PRINTING SYSTEM AND METHOD TO ELIMINATE EXCESS BLANK SPACE BETWEEN PRINT POSITIONS

(75) Inventors: Masaki Hyogo, Ueda (JP); Hiroshi Wanibuchi, Shiojiri (JP); Mitsuhisa Ando, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 1630 days.

(21) Appl. No.: 11/706,733

(22) Filed: Feb. 15, 2007

(65) Prior Publication Data

US 2007/0188789 A1    Aug. 16, 2007

(30) Foreign Application Priority Data

Feb. 16, 2006    (JP) ................................. 2006-039300

(51) Int. Cl.
| | |
|---|---|
| *G06K 15/00* | (2006.01) |
| *G06K 15/22* | (2006.01) |
| *G06K 15/10* | (2006.01) |
| *B41J 2/385* | (2006.01) |
| *B41J 2/015* | (2006.01) |
| *B41J 2/145* | (2006.01) |
| *B41J 2/14* | (2006.01) |
| *H04N 1/40* | (2006.01) |
| *H04N 1/387* | (2006.01) |
| *H04N 1/38* | (2006.01) |
| *H04N 1/23* | (2006.01) |

(52) U.S. Cl.
USPC ............. 358/1.12; 358/1.4; 358/1.1; 358/1.3; 358/1.8; 358/443; 358/453; 358/448; 358/464; 358/296; 347/20; 347/40; 347/47; 347/111; 347/112; 347/152; 347/157

(58) Field of Classification Search
USPC ................... 358/1.4, 1.1, 1.3, 1.8, 1.12, 443, 358/448, 453, 464, 296, 304; 347/20, 40, 347/47, 111, 112, 152, 157
See application file for complete search history.

(56) References Cited

U.S. PATENT DOCUMENTS

| | | | |
|---|---|---|---|
| 6,213,584 B1 * | 4/2001 | Noyes et al. ..................... | 347/40 |
| 2005/0122366 A1 * | 6/2005 | Nagamura et al. .............. | 347/19 |
| 2005/0271446 A1 * | 12/2005 | Minowa ........................ | 400/621 |
| 2005/0275872 A1 * | 12/2005 | Otsuki .......................... | 358/1.15 |

FOREIGN PATENT DOCUMENTS

| | | | |
|---|---|---|---|
| JP | 08039865 A | * | 2/1996 |
| JP | 2000-037889 | | 2/2000 |

* cited by examiner

*Primary Examiner* — Miya J Cato
*Assistant Examiner* — Temitayo Folayan (57) ABSTRACT

A printer having multiple stages of nozzles is controlled to avoid or minimize blank space between print portions when printing on roll paper. A controller in communication with the printer is configured to determine if last partial print data to be printed contains blank raster data. If so, the controller calculates the difference between a total number of rasters in the first through the last partial print data and the number of blank rasters in the last partial print data, prints the last partial print data, and controls the paper transportation mechanism to advance the roll paper only the calculated distance to eliminate excess blank space between print portions. The functionality of the controller is also embodied in a method for controlling a printer as described above.

7 Claims, 9 Drawing Sheets

PRINTING SYSTEM AND METHOD TO ELIMINATE EXCESS BLANK SPACE BETWEEN PRINT POSITIONS

BACKGROUND OF THE INVENTION

1. Technical Field

The present invention relates to a printing system and a printing method, and relates more particularly to a printing system and printing method for printing on roll paper.

2. Related Art

Roll paper is used as the print medium in receipt printers that are typically used in cash registers for example. When printing on the roll paper the printer prints one or multiple lines at a time and then cuts the roll paper when a paper cutting command is asserted after verifying that printing has ended. Printing to roll paper at a cash register therefore enables using roll paper without leaving wasted white space.

Printers that print by moving the print head in a main scanning direction while advancing the paper in a sub-scanning direction include a plurality of nozzles arranged in both the main scanning direction and sub-scanning direction on the print head. Printing occurs by discharging ink from the nozzles. One method of processing the print data in this type of printer is described next.

The print data is converted to raster data for each raster in the main scanning direction and the raster data is allocated to one horizontal line (raster) of nozzles (that is, one row of nozzles in the main scanning direction). Raster data is similarly assigned to all nozzle rows of the print head to generate one set of data referred to herein as "partial print data." This partial print data is then printed in one unit by the print head.

When this type of printer is used to print roll paper, there are cases in which there is not enough raster data for all nozzle rows on the last pass of the print head (that is, when printing the last set of partial print data) and white space is left in the area covered by the nozzles for which there is no raster data. In this case the printer prints the last batch of partial print data containing and then advances the paper a distance including the white space. The roll paper is then cut after the white space. The white space corresponding to the blank raster data left on the roll paper is waste.

SUMMARY

The printing system according to a preferred aspect of the invention enables printing in the white space created at the end of the printed portion of the roll paper when printing to roll paper.

A printing system according to a first aspect of the invention has a raster data generating means for producing raster data from print data, the raster data being data for printing one line; a partial print data generating means for generating partial print data by allocating the raster data to each stage of nozzles disposed to a print head; a storage means for storing the partial print data; a printing means for moving the print head in a main scanning direction and printing the partial print data stored in the storage means to roll paper; and a paper transportation means for advancing the roll paper in a sub-scanning direction. When printing the last partial print data and a part of the last partial print data contains blank raster data continuously to the end, the paper transportation means advances the roll paper a distance equal only to the difference between the total number of rasters that can be printed by the print head and the number of blank rasters in the last partial print data.

The method of the present invention is to convert the print data to raster data and to allocate the raster data to the nozzles of the print head with the allocated raster data printed as partial print data and the roll paper advanced in a controlled manner such that when the last block of partial print data (that is, when printing the last partial print data) contains only blank rasters continuously to the end of the last partial print data, the roll paper advances by only the difference of the total number of rasters that can be printed in one pass of the print head minus the number of blank rasters, that is, a distance equal to the number of rasters from the first raster of the print head to the last raster containing print data to be printed. Because the position of the print head is fixed, the beginning of the roll paper can be aligned with the leading end of the print head by moving the beginning of the white space on the roll paper only this number of rasters. The next print job can therefore start from the beginning of the white space, and excess white space can be eliminated.

A second aspect of the invention additionally has a cutting means for cutting the roll paper after the last partial print data is printed, the cutting means cutting the roll paper at the beginning of the portion corresponding to the blank raster data.

The roll paper can thus be cut without including the white space. Excess white space can therefore be eliminated.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of a printing system according to the present invention is described below with reference to the accompanying figures.

Figure 1:
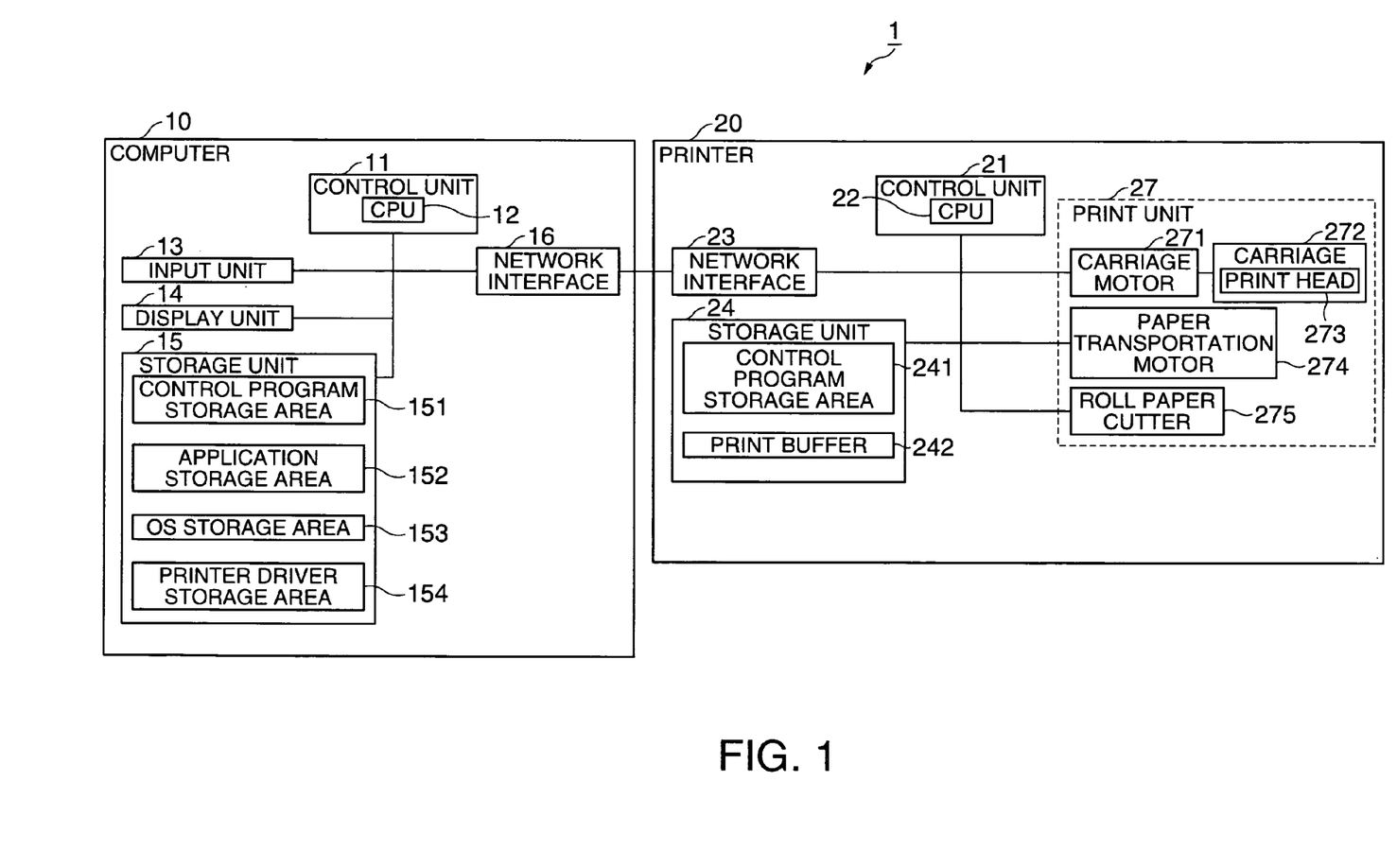
FIG. 1 is a block diagram of a printing system.

FIG. 1 is a block diagram of a printing system 1 according to the present invention. This printing system 1 has a computer 10 and a printer 20. The computer 10 generates or stores data and converts this data to print data. The printer 20 prints based on the print data output from the computer 10.

The computer 10 has a control unit 11, an input unit 13, a display unit 14, a storage unit 15, and a network interface 16. The storage unit 15 has a control program storage area 151, an application storage area 152, an OS storage area 153, and a printer driver storage area 154. The storage unit 15 stores an application program in the application storage area 152 for generating data (the print data in this example) that requires halftone processing (digitizing). A hard disk drive or other storage device is used for the storage unit 15. The control program storage area 151 is used to store programs for controlling the devices connected to the storage unit 15. The user uses the application program stored in the application storage area 152 for generating the print data. The OS storage area 153 is used to store the operating system (OS) that controls the basic computer operations of the computer 10. A printer driver 300 is stored in the printer driver storage area 154 to handle color conversion, halftone processing and command conversion processing. The network interface 16 is for outputting the print data to the printer 20.

The control unit 11 has a CPU 12. The CPU 12 reads the control program from the control program storage area 151 and controls other devices that are connected to the CPU 12. The input unit 13 is used for operating the computer 10 and inputting data. The input unit 13 is typically an input device such as a keyboard or mouse. The display unit 14 is used for displaying computer 10 operations and is typically a display device such as a monitor.

Figure 2:
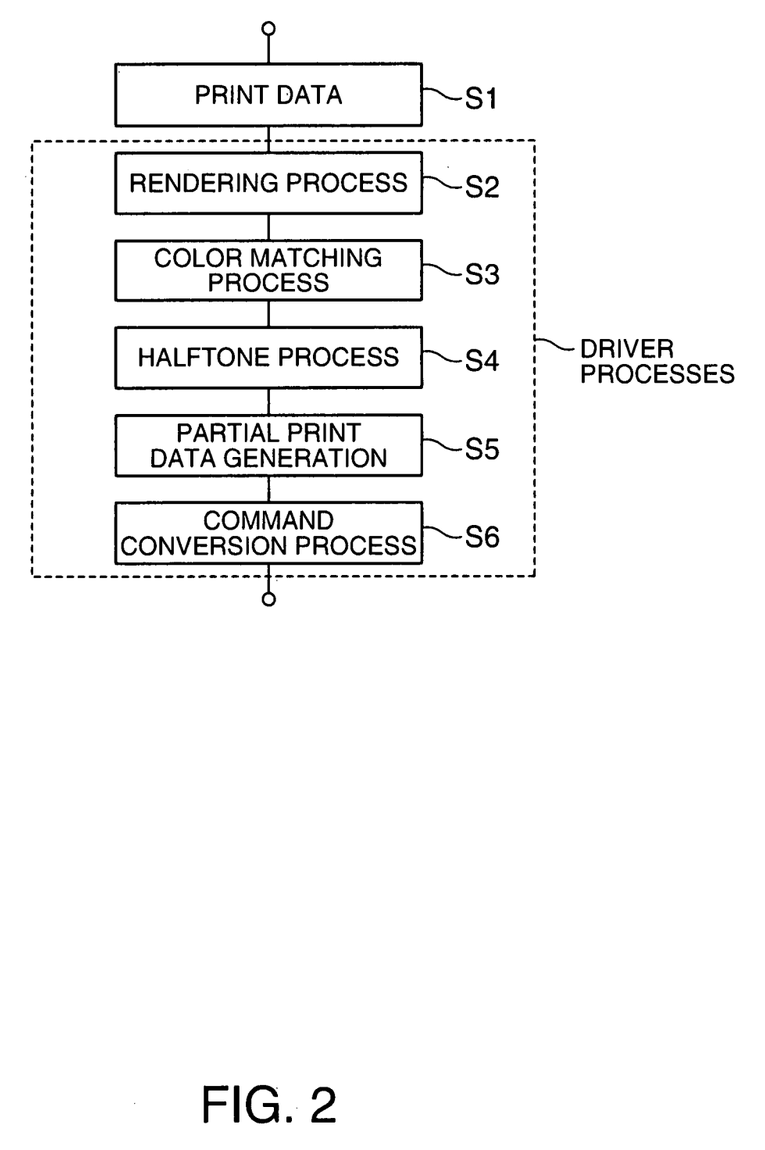
FIG. 2 is a flow chart of operation through command conversion.

FIG. 2 is a flow chart of the operation for converting print data to commands that can be interpreted by the printer. The print data is generated by an application (step S1). A header identifier indicating the start of data is recorded at the beginning of the generated data. The beginning of the data can be detected by finding this header identifier. A footer identifier indicating the end of the data is also recorded at the end of the data. The end of the data can be detected by finding this footer identifier.

The printer driver executes steps S2 to S6 as further described below.

Figure 3:
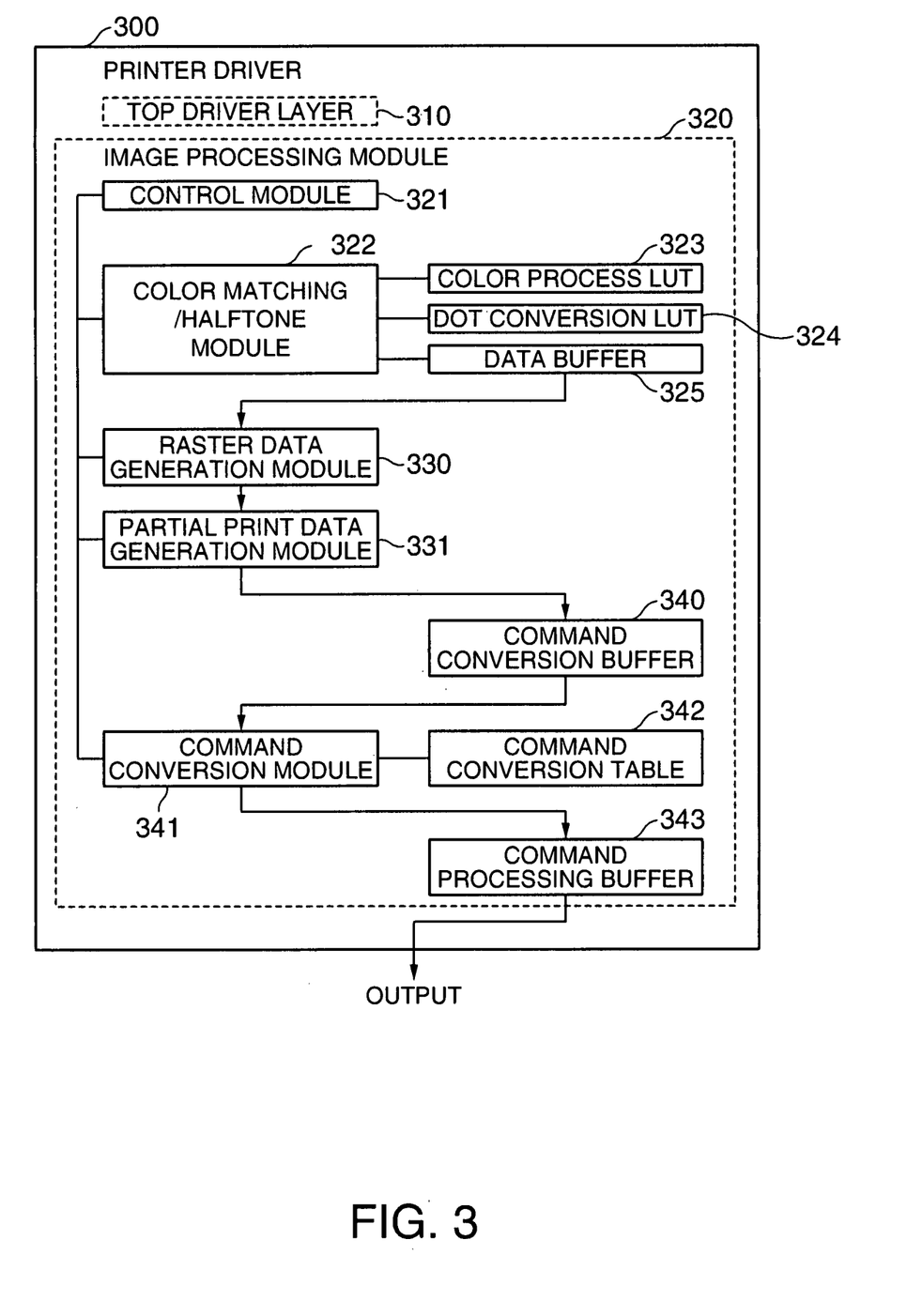
FIG. 3 is a block diagram of the printer driver.

The printer driver 300 as shown in FIG. 3 includes a top driver layer 310 that executes the rendering process, and an image processing module 320.

The rendering process of the top driver layer 310 converts numeric data describing shapes to images of those shapes by means of a mathematical operation. The image processing module 320 includes a control module 321, a color matching/halftone module 322, a raster data generation module 330, a partial print data generation module 331, and a command conversion module 341.

The control module 321 controls the other modules of the image processing module 320.

The color matching portion of the color matching/halftone module 322 runs a color matching process based on the image data by referencing a color process look-up table (LUT) 323. The halftone portion of the color matching/halftone module 322 references a dot conversion LUT 324 to determine whether to render a dot using the printing agent (such as ink). After halftone processing the data is then stored in the data buffer 325.

The raster data generation module 330 generates raster data for one line from the halftone-processed data.

Figure 4:
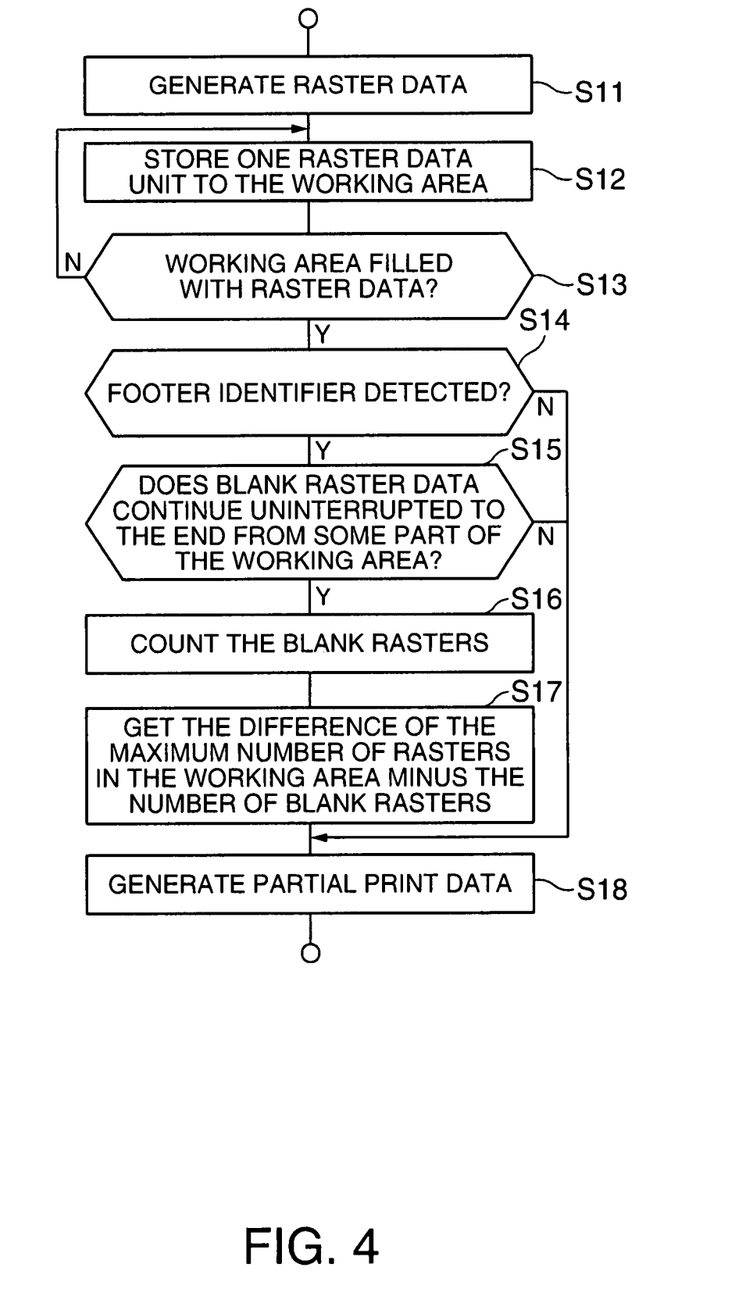
FIG. 4 is a flow chart of the process of the present invention after raster data generation.

FIG. 4 is a flow chart of the process following raster data generation. The raster data is stored in an area that can store data for printing in one pass of the print head (called the "working area" below) (step S11, step S12). This working area is not shown in the figures. If the working area is filled with raster data (step S13 returns Yes) and the footer identifier is not found (step S14 returns No), the partial print data is generated (step S18). The resulting partial print data is then stored in the command conversion buffer 340.

If the footer identifier is detected and the raster data is the last print data (step S14 returns Yes), control goes to step S15.

If a part of the working area contains blank raster data continuously to the end of the working area (step S15 returns Yes), the number of rasters in this blank raster data is counted (step S16). The difference of the maximum number of rasters for which raster data can be stored in the working area (the maximum number of rasters that can be printed by the print head) minus the number of blank rasters is then determined as the raster difference (step S17). The partial print data containing the empty rasters is then generated (step S18). The raster difference that was counted is also stored in the command conversion buffer 340 linked to the last partial print data.

If blank raster data does not continue to the end of the working area in step S15 (that is, the working area is filled with raster data for printing) (step S15 returns No), the partial print data is generated (step S18) and stored in the command conversion buffer 340.

The command conversion module 341 runs a process for converting the partial print data stored in the command conversion buffer 340 to commands that can be interpreted by the printer. The command conversion table 342 is referenced for this conversion. The data output from this command conversion process is then stored in the command processing buffer 343.

The printer 20 has a control unit 21, a storage unit 24, and a print unit 27.

The control unit 21 has a CPU 22. The CPU 21 reads the control program from the control program storage area 241 and controls other devices that are connected to the CPU 21.

The storage unit 24 includes a control program storage area 241 and a print buffer 242. The control program storage area 241 stores a program for controlling the other devices connected to the control unit 21. The print buffer 242 stores data sent from the computer 10.

The print unit 27 has a carriage 272 for carrying the print head 273, a carriage motor 271, a paper transportation motor 274, and a roll paper cutter 275.

The carriage motor 271 moves the carriage 272 in the main scanning direction. The paper transportation motor 274 advances the print medium (roll paper) in the sub-scanning direction. The printer prints by synchronizing driving the carriage motor 271 and paper transportation motor 274 with the ink discharge operation of the print head.

After the last partial print data is printed and the paper is advanced a specific distance, the roll paper cutter 275 cuts the roll paper at the beginning of the portion corresponding to the blank raster data.

Figure 5:
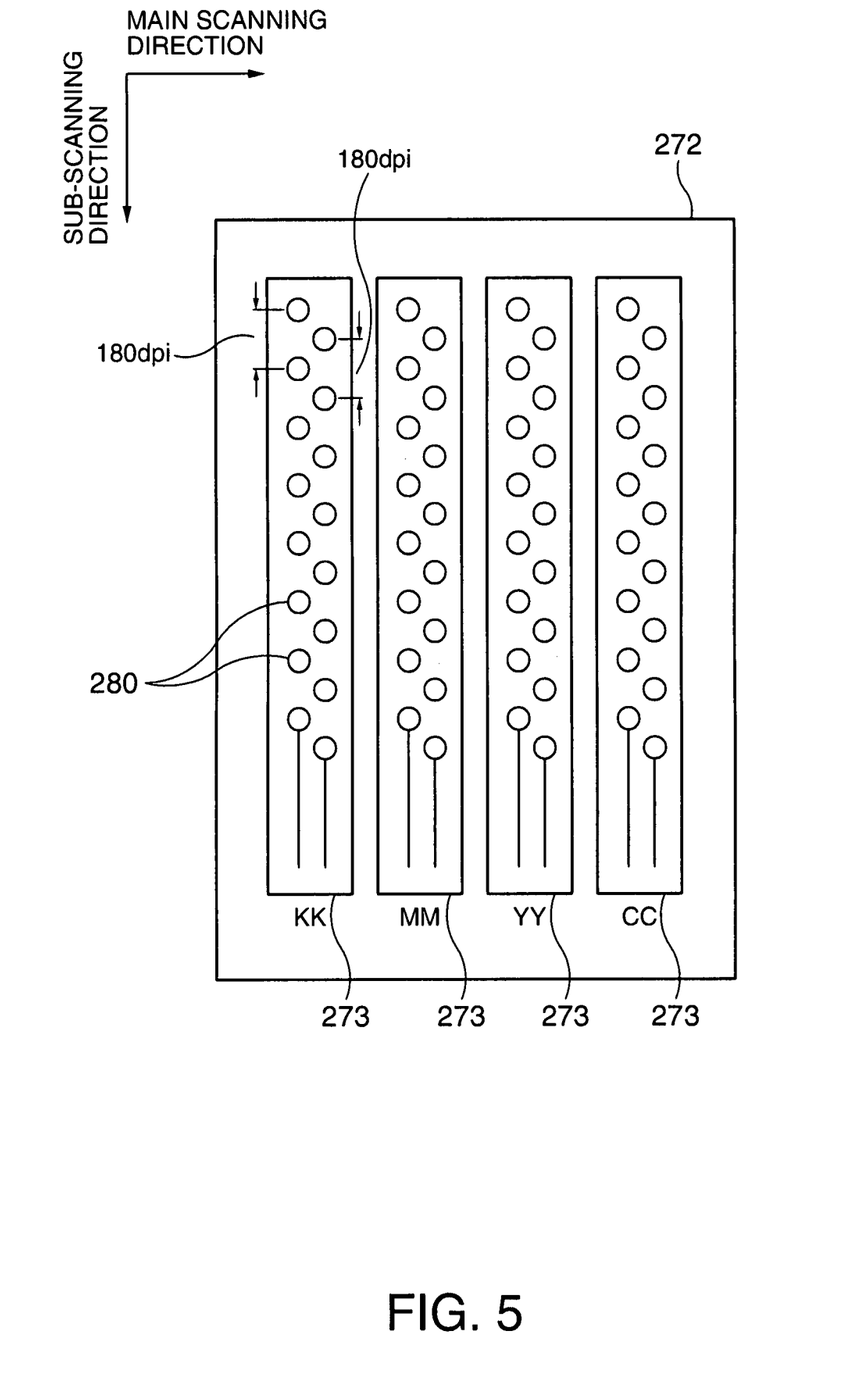
FIG. 5 shows the arrangement of the carriage.

The arrangement of the carriage 272 is described next with reference to FIG. 5. FIG. 5 is a plan view of the carriage from the nozzle face side. Four print heads 273 including one each for K (black), M (magenta), Y (yellow) and C (cyan) are installed on one carriage.

The print heads 273 are arranged in the order K-M-Y-C in the main scanning direction (the direction in which the carriage 272 moves). On the outbound printing pass ink is discharged in the order K-M-Y-C.

Each print head 273 has two rows of nozzles arrayed in the sub-scanning direction, and each nozzle row contains 180 nozzles 280 at a 180 dpi pitch. Because the two nozzle rows in each print head are shifted so that the nozzles 280 in one row are offset one-half dot from the nozzles 280 in the other row, the actual resolution of each print head 273 is the same as a print head having the nozzles 280 in a single row at a 360 dpi resolution.

Figure 6:
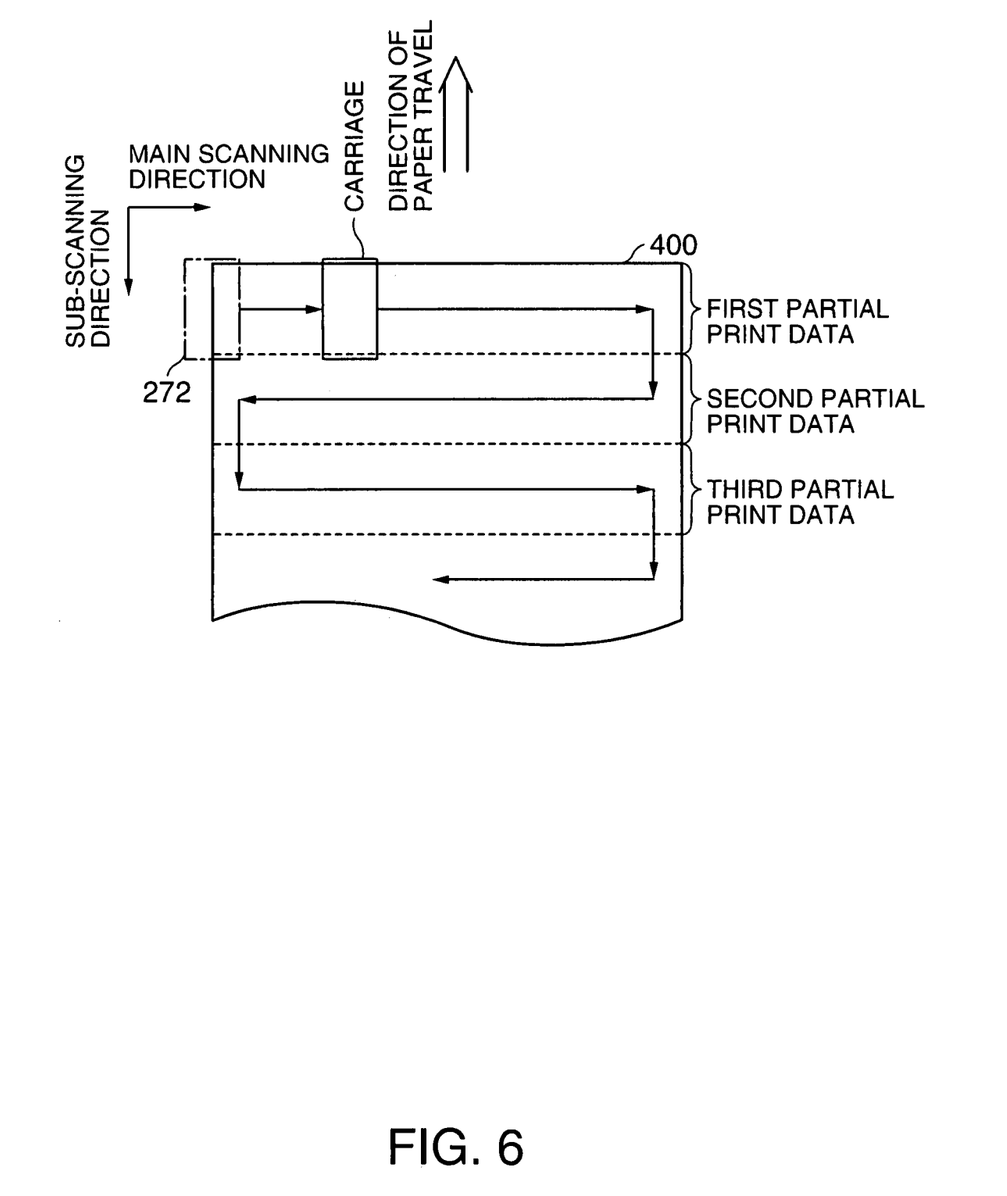
FIG. 6 schematically describes carriage operation.
Figure 7A:
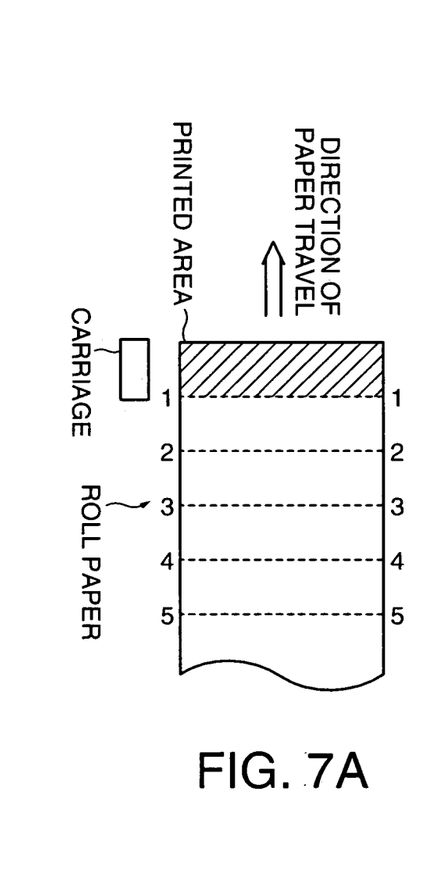
FIG. 7 describes the roll paper printing operation.
Figure 7B:
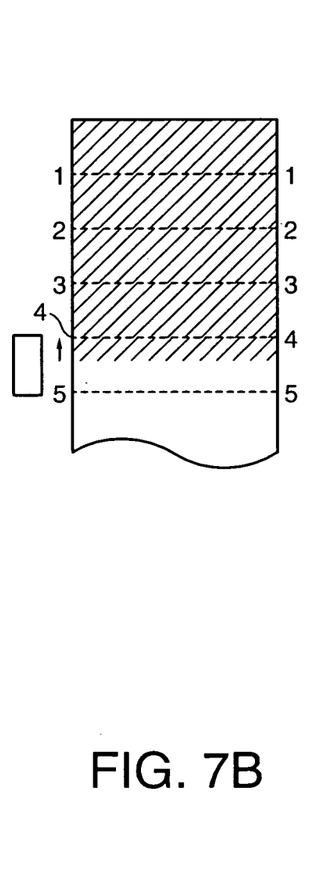
Figure 7C:
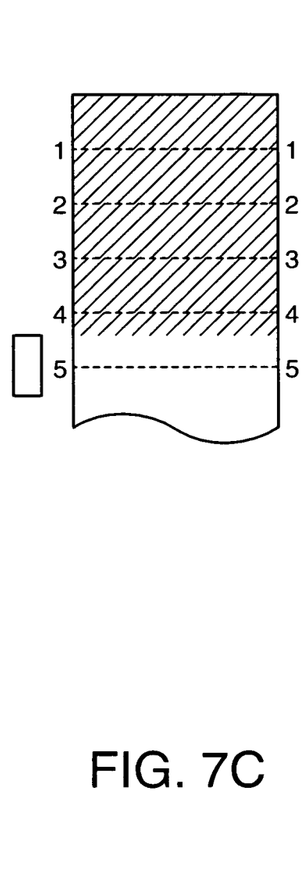
Figure 7D:
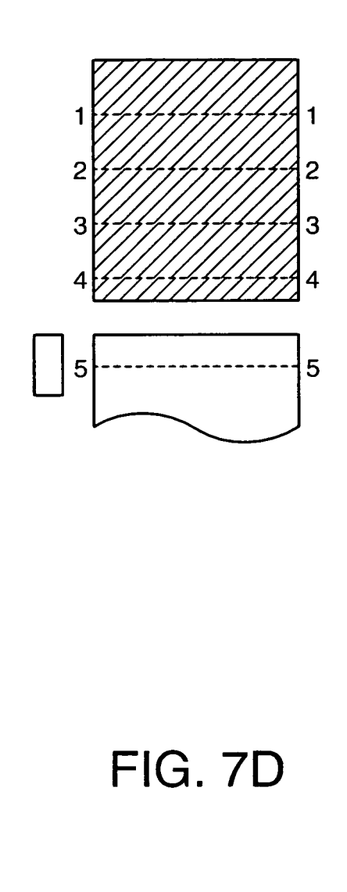
Figure 8A:
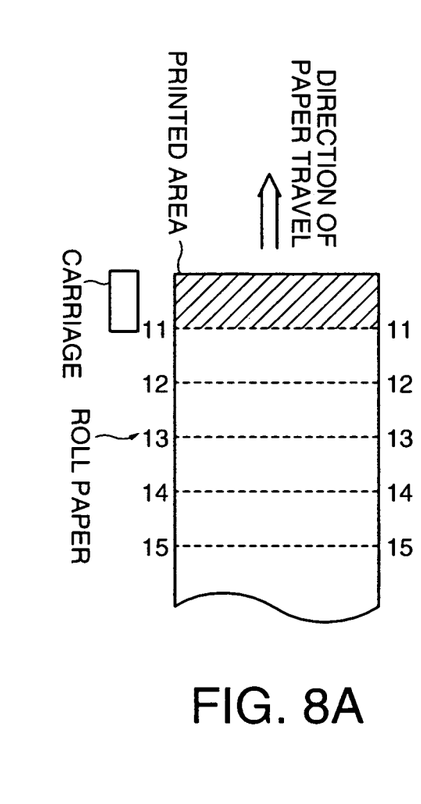
FIG. 8 describes the roll paper printing operation.
Figure 8B:
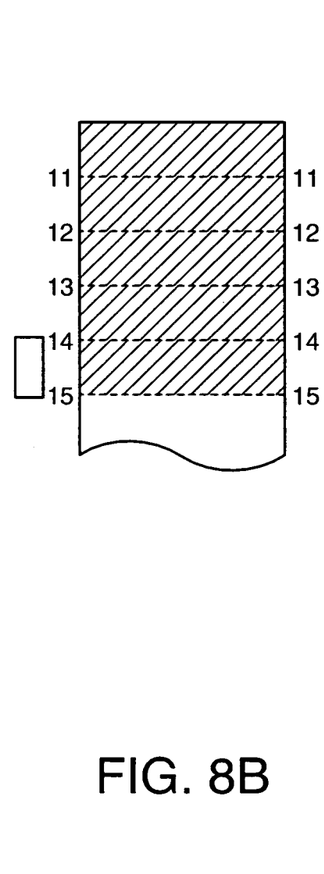
Figure 8C:
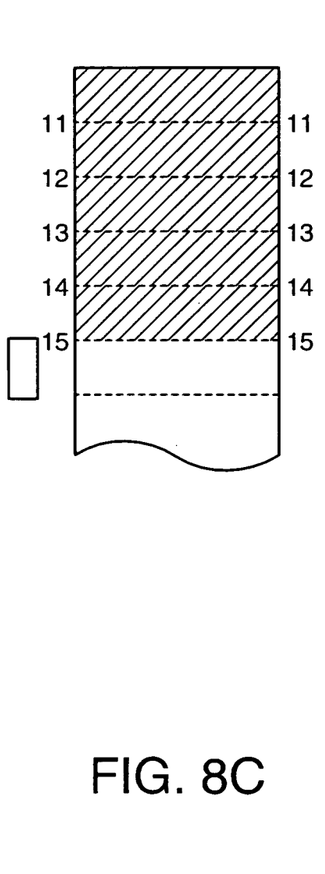
Figure 8D:
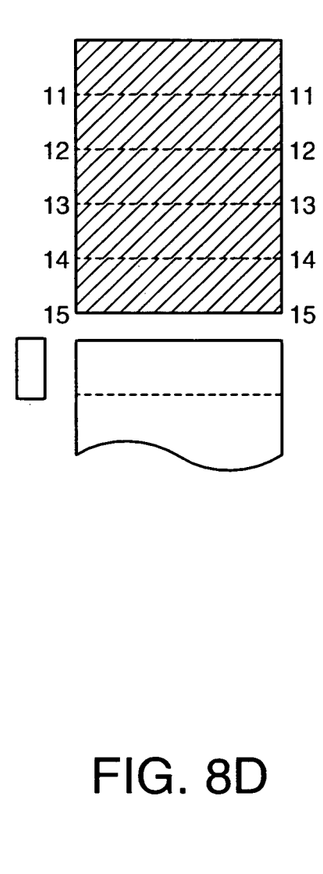

The operation of the carriage 272 is described next with reference to FIG. 6. FIG. 6 shows the relative positions of the print medium (roll paper) 400 and the carriage 272. The carriage 272 moves in the direction of the arrows relative to the print medium 400. If the start-of-printing position is the position denoted by the imaginary line in FIG. 6, the carriage 272 moves in the main scanning direction to the right as seen in the figure while the print head is driven to print. When printing is completed to the right end of this outbound printing pass, the carriage 272 pauses while the paper is advanced in the sub-scanning direction (toward the top of the page as seen in FIG. 6). The carriage 272 then moves in the main scanning direction to the left as seen in the figure to print the next block. When printing to the left end of this pass ends, the carriage 272 again pauses while the print medium 400 is advanced in the sub-scanning direction, and then again travels in the main scanning direction to the right while the print head prints.

For brevity herein, printing while the print head moves to the right in the main scanning direction is referred to as printing on the outbound pass, and printing while the print head moves to the left in the main scanning direction is referred to as printing on the return pass. The print data for one pass of the print head, which is equivalent to the image printed in the area printed in the main scanning direction, is the partial print data. The partial print data that is printed last (the data including the footer identifier) is called the last partial print data.

The print data generated by the application is divided into n units of partial print data by the printer driver. The first unit of partial print data ("first partial print data") is printed on the first outbound pass. The second unit of partial print data (second partial print data) is then printed on the return pass, and the third unit of partial print data (third partial print data) is printed on the next outbound pass. When the last partial print data is printed and all printing has ended, the carriage 272 returns to the start-of-printing position and waits for the next print command.

FIG. 7 shows this roll paper printing operation when the last partial print data contains blank raster data. FIG. 8 shows the roll paper printing operation when the last partial print data does not contain blank raster data. In both FIG. 7 and FIG. 8 printing the roll paper proceeds sequentially from (a) to (d). The numbers along the sides of the roll paper sequentially number the areas that can be printed with each pass of the carriage (print head). The shaded area denotes the printed portion of the roll paper.

Figure 9:
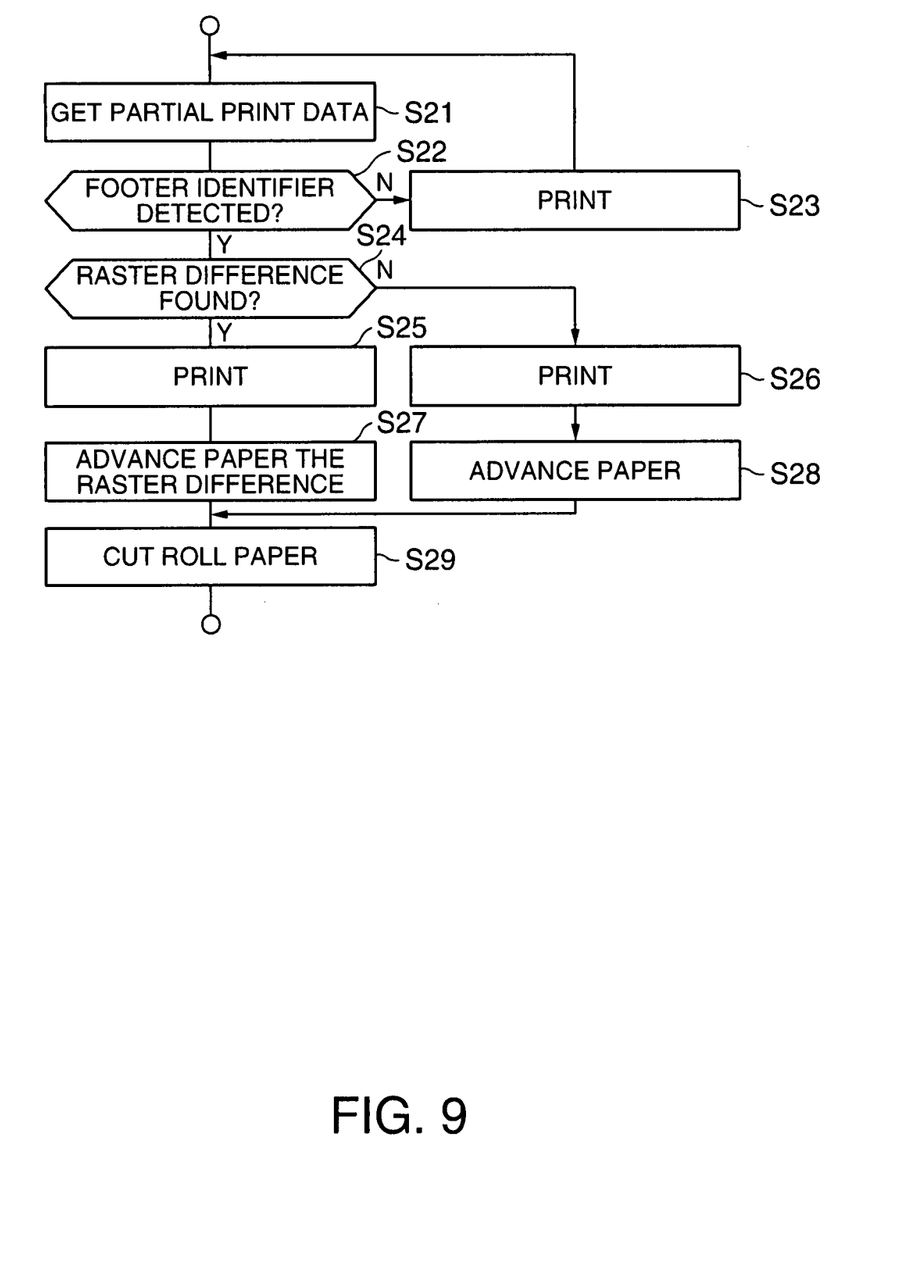
FIG. 9 is a flow chart of the partial print data printing operation.

The printing operation is described next with reference to the flow chart in FIG. 9 for the case shown in FIG. 7 in which the last partial print data contains blank raster data and the case shown in FIG. 8 in which the last partial print data does not contain blank raster data.

When the last partial print data contains blank raster data, the printer gets the partial print data (step S21), determines if the partial print data contains the footer identifier, and prints the partial print data (step S23) if the footer identifier is not found (step S22 returns No) as shown in (a). Printing continues in the same way until the footer identifier is found in the partial print data. When the footer identifier is found (b) in the partial print data (step S22 returns Yes), whether a raster difference count is associated with the partial print data is determined (step S24). Because the raster difference was recorded (step S24 returns Yes), the partial print data is printed (step S25). The paper is then advanced the length of the partial print data at time (c) (step S27). The roll paper is then cut at time (d) (step S29). The arrow in FIG. 7 (b) indicates the distance the paper is advanced (the length of the raster difference).

When the last partial print data does not contain blank raster data, the printer gets the partial print data (step S21), determines if the partial print data contains the footer identifier, and prints the partial print data (step S23) if the footer identifier is not found (step S22 returns No) as shown in (a). Printing continues in the same way until the footer identifier is found in the partial print data. When the footer identifier is found (b) in the partial print data (step S22 returns Yes), whether a raster difference count is associated with the partial print data is determined (step S24). Because a raster difference was not recorded (step S24 returns No), the partial print data is printed (step S26). The paper is then advanced the length of the carriage at time (c) (step S28). The roll paper is then cut at time (d) (step S29).

The computer in this aspect of the invention thus generates partial print data from the print data and the printer prints the partial print data. Alternatively, however, the printer can acquire the print data and both generate and print the partial print data based on the print data.

This aspect of the invention also controls advancing the paper (step S24) after printing the last partial print data by reading the raster difference information. Alternatively, the printer driver can read the raster difference information and tell the printer how far to advance the paper.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A printing system for controlling printing on roll paper using a printer having multiple nozzles disposed to a print head and distributed from an upper part of the print head to a lower part of the print head, the printing system comprising:
    a raster data generating module that generates raster data from processed image data, the raster data including multiple raster rows, each raster row being one row of raster data;
    a partial print data generating module that generates partial print data, each partial print data corresponding to one printing pass of the print head across the roll paper, each partial print data being generated by sequentially allocating raster rows corresponding nozzles starting from said upper part of the print head and proceeding toward said lower part of the print head until all raster rows have been fully allocated, and allocating blank raster rows consisting of blank raster data to nozzles following the last allocated raster row;
    a storage medium that stores the partial print data;
    a carriage assembly that moves the print head in a main scanning direction;
    a paper transportation mechanism that advances the roll paper in a sub-scanning direction;
    a controller that determines if the last partial print data to be printed contains blank raster rows, the controller being further configured to (i) calculate a distance determined from a difference between the total number of raster rows and blank raster rows in the last partial print data and the number of blank raster rows in the last partial print data, (ii) cause the last partial print data to be printed, (iii) control the paper transportation mechanism to advance the roll paper only the calculated distance, and (iv) execute operations (i)-(iii) if it is determined that the last partial print data to be printed contains blank raster rows; and
    a printer driver that issues a command to advance the roll paper as determined by the controller.

2. The printing system described in claim 1, further comprising a cutter that cuts the roll paper after the last partial print data is printed, wherein said cutter cuts the roll paper at the roll paper location corresponding to the first blank raster row in the last partial print data.

3. The printing system described in claim 1, wherein, when the printer driver issues a command to advance the roll paper, the printer driver also instructs the printer to advance the roll paper a specified distance.

4. A method for controlling printing on roll paper using a printer having a printer driver and multiple nozzles disposed to a print head and distributed from art of the ad toward a lower part of the print head, the method comprising the steps of:

generating raster data from processed image data, the raster data including multiple raster rows, each raster row being one row of raster data;

generating partial print data from the raster data, each partial print data corresponding to one printing pass of the print head across the roll paper, each partial print data being generated by allocating raster rows to corresponding nozzles starting from said upper part of the print head and proceeding toward said lower part of the print head until the raster data has been fully allocated, and allocating blank raster rows consisting of blank raster data to nozzles following the last allocated raster row;

storing the partial print data;

moving the print head in a main scanning direction while printing corresponding stored partial print data on the roll paper;

advancing the roll paper in a sub-scanning direction by a fixed distance after printing each partial print data that is not the last partial print data; and determining if the last partial print data to be printed contains blank raster data, and if so,

THEN calculating a distance determined from a difference between a total number of raster rows and blank raster rows in the last partial print data and the number of blank rows in the last partial print data, printing the last partial print data, and advancing the roll paper only the calculated distance;

ELSE advancing the roll paper by said fixed distance.

5. The method described in claim 4, wherein the printer performs the calculating operation and generates the partial print data based on the result of the calculating operation.

6. The method described in claim 4, wherein, when it is determined that last partial print data to be printed contains blank raster data, the printer driver issues a command to advance the roll paper the calculated distance.

7. The method described in claim 4, wherein the printer driver issues a command to execute the roll paper advancing operation and further instructs the printer to advance the roll paper a specified distance.

* * * * *